(12) United States Patent
Hagen et al.

(10) Patent No.: US 6,868,269 B1
(45) Date of Patent: Mar. 15, 2005

(54) INTEGRATING COVERAGE AREAS OF MULTIPLE TRANSPONDER PLATFORMS

(75) Inventors: Frank A. Hagen, Palos Verdes Estates, CA (US); Ying Feria, Manhattan Beach, CA (US); Kar Yung, Torrance, CA (US); Weizheng Wang, Rancho Palos Verdes, CA (US); Donald C. D. Chang, Thousand Oaks, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 704 days.

(21) Appl. No.: 09/649,355

(22) Filed: Aug. 28, 2000

(51) Int. Cl.⁷ .................................................. H04Q 7/20
(52) U.S. Cl. .......................... 455/429; 455/446; 455/447
(58) Field of Search ................................. 455/446, 447, 455/450, 422, 562, 25, 427, 431, 13.1, 429, 67.7, 67.11; 370/316

(56) References Cited

U.S. PATENT DOCUMENTS

| | | |
|---|---|---|
| 4,799,065 A | 1/1989 | Thompson |
| 4,819,227 A | 4/1989 | Rosen |
| 4,823,341 A | 4/1989 | Rosen |
| 5,408,237 A | 4/1995 | Patterson et al. |
| 5,444,450 A | 8/1995 | Olds et al. |
| 5,555,257 A | 9/1996 | Dent |
| 5,594,941 A | 1/1997 | Dent |
| 5,732,351 A | 3/1998 | Olds et al. |
| 5,754,139 A | 5/1998 | Turcotte et al. |
| 5,825,325 A | 10/1998 | O'Donovan et al. |
| 5,856,804 A | 1/1999 | Turcotte et al. |
| 5,862,480 A | 1/1999 | Wild et al. |
| 5,864,579 A | 1/1999 | Briskman |
| 5,907,816 A | 5/1999 | Newman et al. |
| 5,918,157 A | 6/1999 | Wiedeman et al. |
| 5,946,625 A | 8/1999 | Hassan et al. |
| 5,966,371 A | 10/1999 | Sherman |
| 5,974,317 A | 10/1999 | Djuknic et al. |
| 5,974,324 A | * 10/1999 | Henson ..................... 455/447 |
| 5,982,337 A | 11/1999 | Newman et al. |
| 6,002,935 A | * 12/1999 | Wang ........................ 455/447 |
| 6,014,372 A | 1/2000 | Kent et al. |
| 6,023,463 A | 2/2000 | Wiedeman et al. |
| 6,047,186 A | * 4/2000 | Yu et al. .................... 455/446 |
| 6,058,308 A | 5/2000 | Kallin et al. |
| 6,088,341 A | 7/2000 | Hinedi et al. |
| 6,150,977 A | 11/2000 | Wilcoxson et al. |
| 6,157,811 A | 12/2000 | Dent |
| 6,167,263 A | 12/2000 | Campbell |

(List continued on next page.)

FOREIGN PATENT DOCUMENTS

| | | |
|---|---|---|
| EP | 0 549 220 A | 6/1993 |
| WO | WO 96 31016 A | 10/1996 |
| WO | WO 98/51568 A | 11/1998 |
| WO | WO 99 13598 A | 3/1999 |
| WO | WO 99 23769 A | 5/1999 |
| WO | WO 01/95220 A2 | 12/2001 |
| WO | WO 01/95523 A3 | 12/2001 |
| WO | WO 01/97388 A3 | 12/2001 |
| WO | WO 01/97406 A3 | 12/2001 |

OTHER PUBLICATIONS

U.S. Appl. No. 09/718,973, filed Nov. 21, 2000, Weizheng et al.

(List continued on next page.)

*Primary Examiner*—Charles Appiah
(74) *Attorney, Agent, or Firm*—Georgann S. Grunebach

(57) ABSTRACT

A method for integrating coverage areas of multiple transponder platforms includes the step of arranging a plurality of coverage areas in a cluster wherein each of the plurality of coverage areas is assigned a color that differs from that of every other coverage area in a same cluster and wherein each of the plurality of coverage areas overlaps at least one other coverage area in the same cluster for maximizing utilization of multiple system resources.

50 Claims, 7 Drawing Sheets

U.S. PATENT DOCUMENTS

| | | | |
|---|---|---|---|
| 6,169,910 B1 * | 1/2001 | Tamil et al. ............... | 455/562 |
| 6,173,178 B1 | 1/2001 | Hammill et al. | |
| 6,178,328 B1 * | 1/2001 | Tang et al. ............... | 455/447 |
| 6,188,896 B1 | 2/2001 | Perahia et al. | |
| 6,195,037 B1 | 2/2001 | Gross et al. | |
| 6,195,555 B1 | 2/2001 | Dent | |
| 6,208,858 B1 | 3/2001 | Antonio et al. | |
| 6,236,834 B1 | 5/2001 | Poskett et al. | |
| 6,240,072 B1 | 5/2001 | Lo et al. | |
| 6,311,068 B1 * | 10/2001 | Leung et al. ............. | 455/447 |
| 6,317,412 B1 | 11/2001 | Natali et al. | |
| 6,339,708 B1 * | 1/2002 | Wang ...................... | 455/447 |
| 6,377,802 B1 | 4/2002 | McKenna et al. | |
| 6,388,615 B1 * | 5/2002 | Chang et al. ............. | 342/368 |
| 6,434,384 B1 | 8/2002 | Norin et al. | |
| 6,438,379 B1 | 8/2002 | Gitlin et al. | |
| 6,452,962 B1 | 9/2002 | Linsky et al. | |
| 6,456,846 B2 | 9/2002 | Norin et al. | |
| 6,507,742 B1 * | 1/2003 | Lin et al. ................. | 455/446 |
| 6,567,052 B1 | 5/2003 | Wang et al. | |
| 2002/0006795 A1 | 1/2002 | Norin et al. | |
| 2002/0041575 A1 | 4/2002 | Karabinis et al. | |
| 2002/0072332 A1 | 6/2002 | Chang et al. | |
| 2002/0072361 A1 | 6/2002 | Knoblach et al. | |
| 2002/0080732 A1 | 6/2002 | Feria et al. | |
| 2002/0081969 A1 * | 6/2002 | Chang et al. ............. | 455/13.1 |
| 2002/0126042 A1 | 9/2002 | Chang et al. | |

OTHER PUBLICATIONS

U.S. Appl. No. 09/664,940, filed Sep. 19, 2000, Walsh et al.

U.S. Appl. No. 09/612,465, filed Jul. 7, 2000, Wang et al.

U.S. Appl. No. 09/594,375, filed Jun. 15, 2000, Chang et al.

U.S. Appl. No. 09/594,374, filed Jun. 15, 2000, Chang et al.

R. Suzuki, et al., "Mobile TDM/TDMA System with Active Array Antenna", Global Telecommunications Conference, 1991; Globecom '91; Dec. 2–5, 1991, pp. 1569–1573, vol. 3.

U.S. Appl. No. 09/566,759, filed May 5, 2000, Novak et al.

U.S. Appl. No. 09/611,753, filed Jul. 7, 2000, Chang et al.

K. K. Chan, F. Marcoux, M. Forest, L. Martins–Camelo, "A Circularly Polarized Waveguide Array for Leo Satellite Communications", pp. 154–157, IEEE1999 AP–S International Symposium, Jun. 1999.

M. Oodo, R. Miura, Y. Hase, "Onboard DBF Antenna for Stratospheric Platform", pp. 125–128, IEEE Conference on Phased Array Systems and Technology, California, May 21–25, 2000.

Yokosuka Research Park, "The First Stratospheric Platform Systems Workshop", pp 1–216, May 12–13, 1999.

* cited by examiner

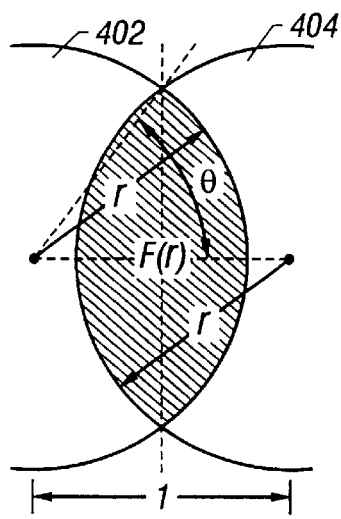
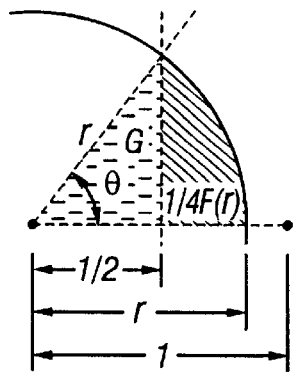
FIG. 4A  FIG. 4B
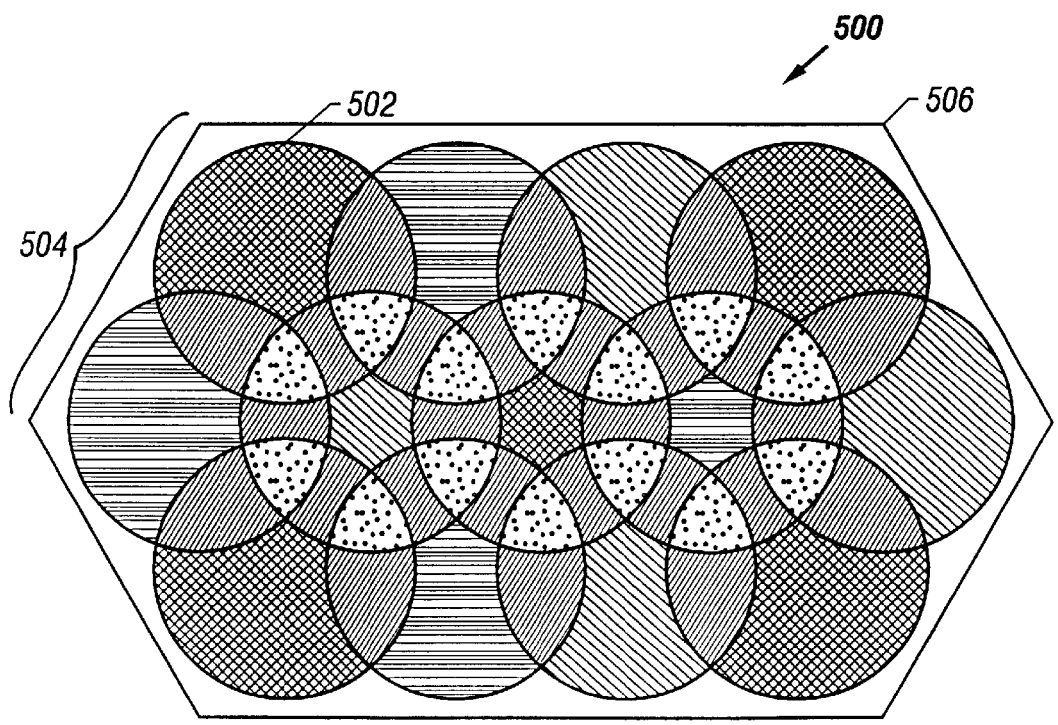
FIG. 5

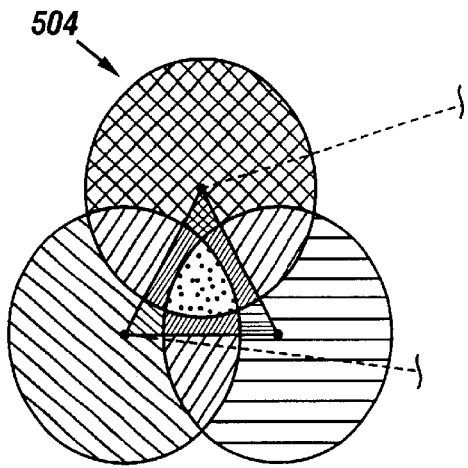
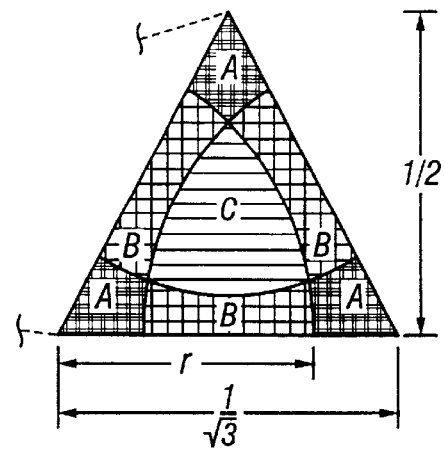
FIG. 6A  FIG. 6B
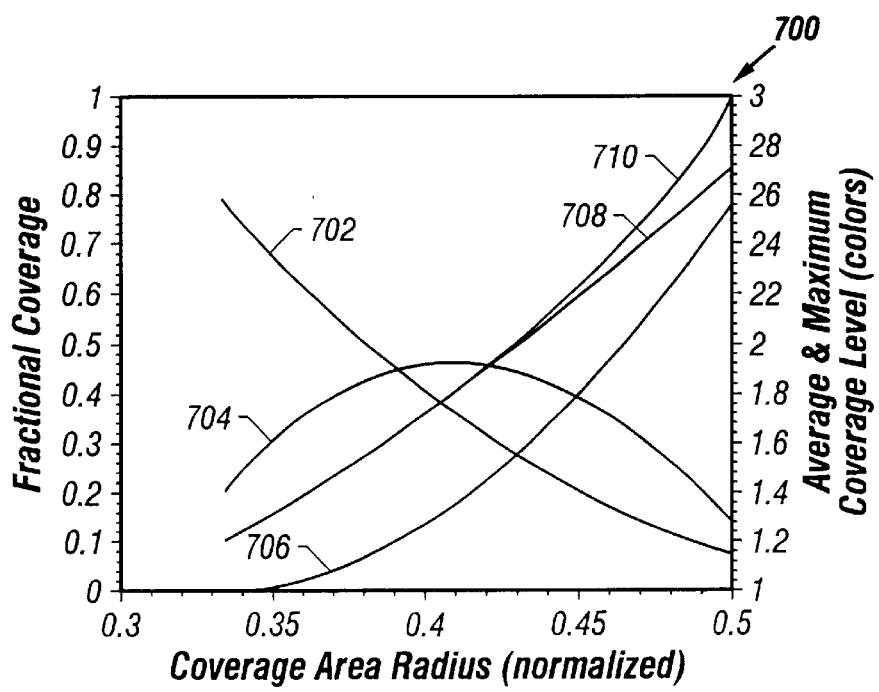
FIG. 7

INTEGRATING COVERAGE AREAS OF MULTIPLE TRANSPONDER PLATFORMS

BACKGROUND OF THE INVENTION

The present invention relates generally to cell coloring techniques for telecommunications service coverage areas. More specifically, but without limitation thereto, the present invention relates to minimizing the number of cell colors required in coverage areas serviced by high altitude transponder platforms for fixed and mobile communications.

Transponder platforms for CDMA communications typically use spot beams to isolate cells assigned the same color, i.e., those using the same allocation of system resources such as CDMA codes, frequency, time slot, etc. Each color, or subset of available resources, corresponds to a specific allocation of system resources, and the coloring pattern is done in such a way as to ensure minimal interference between signals transmitted to or received from adjacent cells by allowing only differently colored cells to share a common border.

A primary figure of merit for conventional cell coloring techniques is the minimum distance between cells assigned the same color. Individual cells are typically defined by spot beams formed by an antenna, and the response of such beams does not generally roll off sharply at the edges. The isolation between cells assigned the same color may be increased by increasing their spatial separation, but this approach sacrifices utilization of total resources allocated to communications, or equivalently, increases the number of colors. Two common cell coloring schemes for cells defined by individual spot beams are the four color scheme and the seven color scheme.

FIG. 1 is a diagram illustrating a standard four color scheme 100 of the prior art. Each color is illustrated by a different shading pattern and represents a unique assignment of resources, for example, one or more CDMA codes, time slots, and/or frequency bands. Each cell 102 is typically illuminated by a single spot beam from a transponder platform. In this example, each cluster 104 of four colors has the shape of a rhombus that contains exactly one hexagonal cell 102 of each color centered on each vertex respectively of the rhombus. The cells 102 and the clusters 104 are arranged as shown on a rhombic grid to cover an area of arbitrary size such that any two cells assigned the same color are separated by at least one cell assigned a different color.

FIG. 2 is a diagram illustrating a standard seven color scheme 200 of the prior art. In this example, each cluster 202 has the shape of a hexagon and contains exactly one hexagonal cell 204 of each color centered on each vertex respectively of the hexagon, with the seventh cell being centered at the geometric center of the hexagon. The cells 204 and the clusters 202 are arranged as shown on a hexagonal grid to cover an area of arbitrary size such that any two cells assigned the same color are separated by at least two cells assigned different colors.

SUMMARY OF THE INVENTION

The present invention advantageously addresses the needs above as well as other needs by providing a method and apparatus for integrating coverage areas of multiple transponder platforms.

In one embodiment, the invention may be characterized as a method for integrating coverage areas for multiple transponder platforms that includes the step of arranging a plurality of coverage areas in a cluster wherein each of the plurality of coverage areas is assigned a color that differs from that of every other coverage area in a same cluster and wherein each of the plurality of coverage areas overlaps at least one other coverage area in the same cluster for maximizing utilization of multiple system resources.

In another embodiment, the invention may be characterized as an apparatus for integrating coverage areas of multiple transponder platforms that includes a plurality of transponder platforms and an antenna coupled to each of the plurality of transponder platforms wherein each antenna illuminates one of a plurality of coverage areas, each of the plurality of coverage areas is grouped into a cluster, each of the plurality of coverage areas is assigned a color that differs from that of every other coverage area in a same cluster, and each of the plurality of coverage areas overlaps at least one other coverage area in the same cluster for maximizing utilization of multiple system resources.

The features and advantages summarized above in addition to other aspects of the present invention will become more apparent from the description, presented in conjunction with the following drawings.

BRIEF DESCRIPTION OF THE DRAWINGS

The above and other aspects, features and advantages of the present invention will be more apparent from the following more specific description thereof, presented in conjunction with the following drawings wherein:

FIG. 4A is a diagram of the intersection F(r) of two circles of radius r whose centers are unit distance apart illustrating the calculation of F(r) according to another embodiment of the present invention;

FIG. 4B is a detailed diagram of ¼ the area defined by the intersection F(r) in FIG. 4A;

FIG. 5 is a diagram illustrating coverage levels provided by a constellation of 13 transponder platforms using a three color scheme according to yet another embodiment of the present invention;

FIG. 6A is a diagram of coverage within a single triangular cluster for the arrangement of FIG. 5;

FIG. 6B is a detailed diagram of levels of area coverage for the triangular cluster of FIG. 6A;

FIG. 7 is a plot of the fraction of an area covered at each of three possible coverage levels, the average coverage level over the entire service area, and the maximum average coverage level, each as a function of the normalized coverage area radius for the arrangement of FIG. 5;

Corresponding reference characters indicate corresponding components throughout the several views of the drawings.

DETAILED DESCRIPTION OF THE DRAWINGS

The following description is presented to disclose the currently known best mode for making and using the present invention. The scope of the invention is defined by the claims.

In contrast to methods for coloring cells only by single spot beams, the present invention introduces coloring of the entire coverage area served by each transponder platform of a constellation. Each coverage area may include an arbitrary number of cells or spot beams, and overlapping of coverage areas of different colors is exploited advantageously for using multiple system resources within each of the multiple coverage areas. Extensive overlapping of service coverage areas is a consequence of the fact that the coverage area of a single platform is typically much larger than the separation required for isolation or reuse.

Each coverage area is assigned a resource or color such that no two coverage areas assigned the same color overlap, while extensive overlap of coverage areas assigned different colors is exploited to maximize multiple use of system resources within each coverage area. The multiple use of system resources within each coverage area accommodates a greater number of subscribers in the same coverage area than conventional arrangements of coverage areas of multiple transponder platform systems without increasing the number of CDMA codes or the communications frequency bandwidth.

In one embodiment, the coverage areas are arranged in a regular lattice of similar clusters, where each cluster has the shape of an N-sided polygon and contains exactly one coverage area of each color centered on a vertex of the N-sided polygon.

In another embodiment, additional system resources may be assigned to a given coverage area if an exclusion band having an appropriate width is maintained between each coverage area and all other coverage areas assigned the same color. The width of the exclusion band may range from zero to the difference between the distance between like-colored coverage areas and the diameter of a coverage area. A reasonable choice for the width of the exclusion band is the diameter of a spot beam.

In a further embodiment, the coverage areas may be shaped by illuminating only specific spot beams within each coverage area to maintain the desired separation between coverage areas assigned the same color, including exclusion bands, if any.

Figure 1:
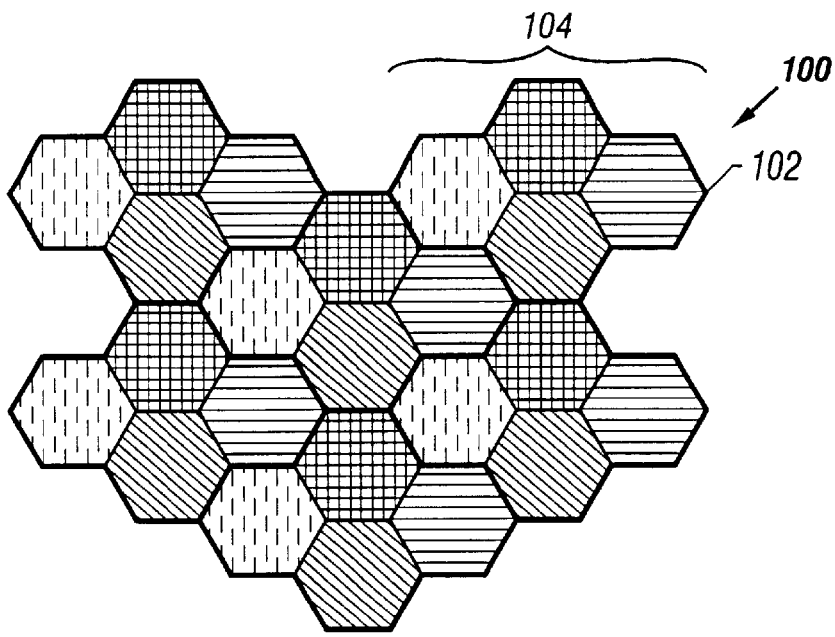
FIG. 1 is a diagram illustrating a standard four color scheme of the prior art.
Figure 2:
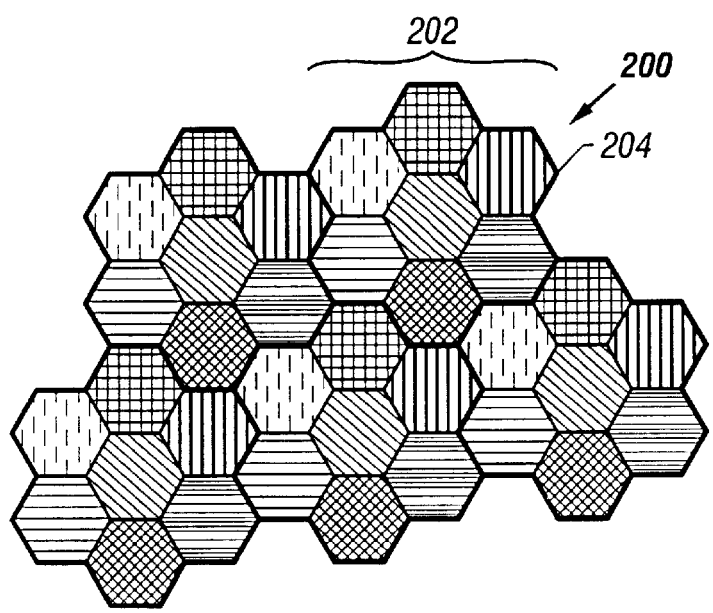
FIG. 2 is a diagram illustrating a standard seven color scheme of the prior art.
Figure 3A:
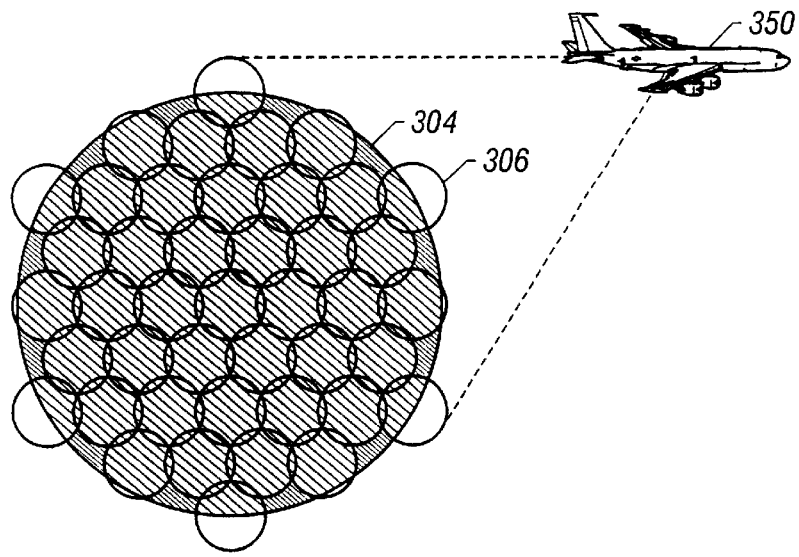
FIG. 3A is a diagram of a coverage area for a single transponder platform having individual cells or spot beams according to one embodiment of the present invention.
Figure 3B:
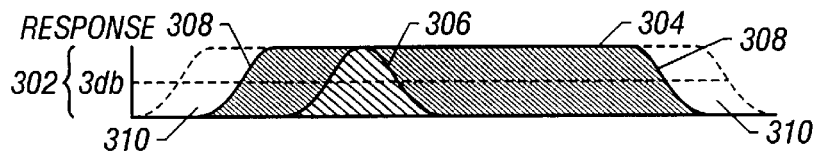
FIG. 3B is a plot of antenna response vs. distance from the center of the coverage area illustrated in FIG. 3A that also shows the response of a single spot beam.

FIG. 3A is a diagram of a coverage area 304 illuminated by an antenna of a single transponder platform 350 that has individual cells or spot beams 306. FIG. 3B is a plot of an antenna response for a single transponder platform 350 vs. distance from the center of the coverage area illustrated in FIG. 3A that also illustrates the roll-off 308 of one single spot beam 306. The spot beams 306 are formed by an antenna mounted on the transponder platform 350 according to well known techniques, some of which are described below. In this example, the transponder platform 350 is an unmanned aircraft, however other transponder platforms may also be used, such as antenna towers and satellites.

In one embodiment, unmanned aircraft are preferable, because they can readily be maintained in a relatively fixed position in the atmosphere, for example, by flying in a 2 km circle.

As illustrated in FIG. 3B, the roll-off 308 of the antenna response 302 at the edge of the coverage area 304 is determined primarily by the size of the spot beam 306 rather than by the size of the coverage area 304. Also, individual spot beams within the coverage area 304 may be colored using conventional coloring schemes without interfering with the coloring method described below.

The isolation required to reuse a system resource or color is provided by introducing an exclusion band 310 around the coverage area 304 assigned to a specific system resource. The exclusion band has an outer perimeter that does not intersect any other coverage area assigned the same color. The system resource assigned to the coverage area 304 may not be used within the exclusion band 310, although use of any other system resource within the exclusion band 310 is permitted. A system resource may be used everywhere that it is not excluded by one or more of the exclusion bands around coverage areas assigned the same color. The width of the exclusion band 310 is preferably about the width of the spot beam 306. Because the exclusion band 310 is much smaller than the coverage area 304, the overlap of coverage areas of different colors may be advantageously increased compared to the degree of overlap possible with conventional coloring methods that use the spot beams 306 for each color. The overlapping of coverage areas of different colors results in fewer colors required for the spot beams 306 to accommodate the same number of subscribers, or the same number of colors may be used to accommodate a greater number of subscribers.

An advantage of the coloring method of the present invention is that the transponder platform may select the shape of the coverage area 304 being serviced. Also, the coverage area 304 may be shaped differently for each resource by selecting which spot beams 306 to illuminate within each coverage area 304. The size and shape of the coverage area 304 may therefore be adjusted dynamically to improve resource utilization. For example, the coverage area served by a single transponder platform may be reduced to increase the signal power to each user for closing the forward link inside buildings and for using omnidirectional antennas in transponder platform architectures for mobile telecommunications. Also, individual spot beams 306 may be allocated to serve individual users in a rigid grid or lattice as shown or each user may be assigned a spot beam 306 that follows the motion of the user.

Figure 3C:
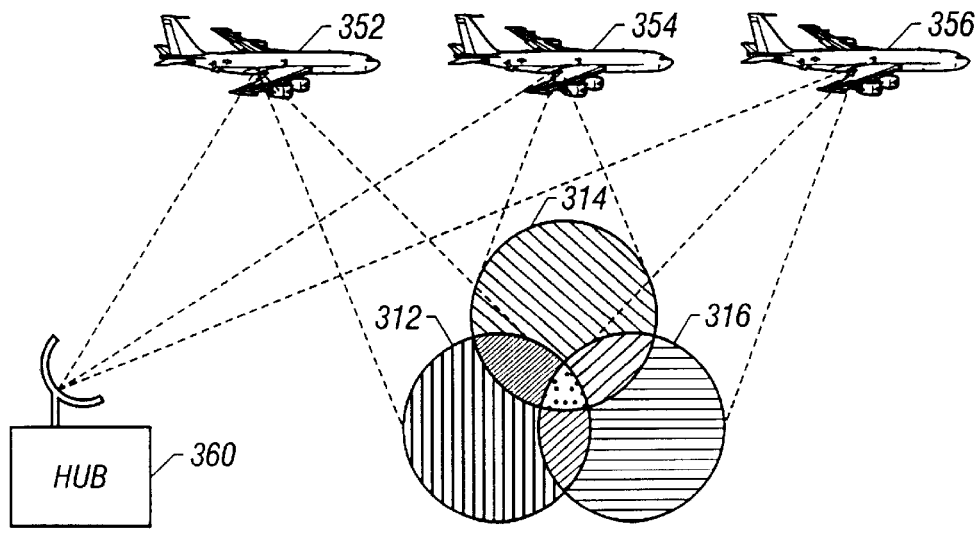
FIG. 3C is a diagram of overlapping coverage areas of multiple transponder platforms.

FIG. 3C is a diagram of overlapping coverage areas 312, 314, and 316 illuminated respectively by a plurality of transponder platforms 352, 354, and 356. Each of the overlapping coverage areas 312, 314, and 316 may be a coverage area similar to that described for FIG. 3A having a different color so that overlapping may be used advantageously without mutual interference to improve the utilization of multiple resources.

As an example, the coverage area 304 and the spot beams 306 illustrated in FIG. 3A and described above may be implemented by a beamformer in each of the transponder platforms 352, 354, and 356 or by one or more ground-based beamformers in a gateway hub 360. By locating the beamformer at the ground station, the disadvantages of the added weight and power of locating a beamformer in each of the transponder platforms 352, 354, and 356 may be avoided. Also, element delays may be calculated and implemented without having to upload them to each of the transponder platforms 352, 354, and 356. Another advantage of beamforming in the gateway hub 360 is that multiple beamformers may be used with multiple transponder platforms in various arrangements to suit specific applications.

FIG. 4A is a diagram of the intersection F(r) of two circles of radius r whose centers are unit distance apart illustrating the calculation of F(r). The intersection of circles 402 and 404 defines an area F(r) where r is the radius of each of circles 402 and 404 normalized by the distance between centers. The normalization simplifies the scaling of r to any desired coverage area. Various other shapes and sizes of coverage areas may be used to practice the present invention in specific applications without departing from the spirit and scope of the invention.

FIG. 4B is a detailed diagram of ¼ the area defined by the intersection F(r) in FIG. 4A. In FIG. 4B, ¼ the area F(r) defined by the intersection of two circles 402 and 404 may be expressed by the formula $$\frac{1}{4}F(r) = \frac{\theta}{2\pi}\pi r^2 - \frac{1}{2}r^2 \sin\theta\cos\theta \quad (1)$$

where F(r) is the overlapping area of the circles 402 and 404 and θ is the half-angle subtended by the overlapping area measured from the center of either circle. Formula (1) simplifies to $$F(r) = r^2(2\theta - \sin 2\theta) \quad (2)$$

$$= 2r^2 \arccos\left(\frac{1}{2r}\right) - \sqrt{r^2 - \frac{1}{4}}$$

This result may be used in the following examples to compute resource utilization for embodiments using three and four colors.

The maximum possible width of the exclusion band Δ for normalized coverage areas, all assigned the same color and packed as closely as possible, is given by $$\Delta = 1 - 2r \quad (3)$$

If the width of the exclusion band is chosen to be equal to the diameter of a single spot beam to give two beam-widths isolation, then the radius of the coverage area may be expressed relative to the radius of a spot beam by $$\frac{r}{\frac{1}{2}\Delta} = \frac{2r}{1-2r} \quad (4)$$

Relation (4) may be squared to give the coverage area of a single platform in spot beams, assuming that the spot beams are all of uniform size. The size of the normalized coverage area is constrained by the requirement that coverage areas assigned the same color may not overlap, and may be simply stated as $$r \leq \frac{1}{2} \quad (5)$$

Further incorporating the exclusion band that separates coverage areas assigned the same color from one another gives the result $$r \leq \frac{1}{2}(1-\Delta) \quad (6)$$

The value of r is also constrained from below by the requirement that every point in the service area must be within the coverage area of at least one transponder platform. This constraint generally depends on the color scheme, and will be discussed separately in the examples below.

Three Color Example

The minimum number of resource colors that may be used to cover a large service area spanned by several single platform coverage areas is 3. FIG. 5 is a diagram illustrating coverage levels provided by a constellation of 13 transponder platforms using a three color scheme 500. The single platform coverage areas 502 are grouped into clusters 504. Each cluster 504 has the shape of a triangle and contains exactly one coverage area 502 of each color centered on a vertex of the triangle in the center of each cluster 504. Each cluster 504 is arranged in a lattice on a triangular grid 506 that defines the service area. All of the clusters 504 are related to one another through rotations and/or reflections, therefore an analysis of one cluster 504 is applicable to all.

As explained above, a lower limit on the size of the coverage areas follows from the requirement to provide at least single coverage everywhere in the service area, i.e., no gaps are permitted. The center of each triangular cluster 504 must therefore include all three colors of coverage areas 502, i.e., $$r \geq \frac{1}{3} \quad (7)$$

Combining relation (7) with the upper limit of relation (6) that forbids overlap of like-colored coverage areas 502 gives $$\frac{1}{3} \leq r \leq \frac{1}{2}(1-\Delta) \quad (8)$$

FIG. 6A is a diagram of coverage within a single triangular cluster 504 for the arrangement of FIG. 5. FIG. 6B is a detailed diagram of levels of area coverage for the triangular cluster 504 of FIG. 6A. Each of the three possible coverage levels is indicated for each overlap region as follows: single coverage areas are labeled "A", double coverage areas are labeled "B", and triple coverage areas are labeled "C". The following relations using formula (2) for F(r) describe the area for each coverage level:

$$6(A + 2B + C) = \pi r^2 \quad (9)$$

$$2(B + C) = \frac{1}{3}F(\sqrt{3}r)$$

-continued $$3A + 3B + C = \frac{1}{12}\sqrt{3}$$

Relations (9) may be solved to obtain $$A = \frac{1}{12}\sqrt{3} - \frac{\pi}{3}r^2 + \frac{1}{6}F(\sqrt{3}r) \quad (10)$$

$$B = -\frac{1}{12}\sqrt{3} + \frac{\pi}{2}r^2 + \frac{1}{3}F(\sqrt{3}r)$$

$$C = \frac{1}{12}\sqrt{3} - \frac{\pi}{2}r^2 + \frac{1}{2}F(\sqrt{3}r)$$

The resulting fractional and average coverage levels within the cluster 504 are given by $$\eta_1 = \frac{3A}{\frac{1}{12}\sqrt{3}} = 3 - 4\sqrt{3}\left[\pi r^2 - \frac{1}{2}F(\sqrt{3}r)\right] \quad (11)$$

$$\eta_2 = \frac{3B}{\frac{1}{12}\sqrt{3}} = -3 + 6\sqrt{3}\left[\pi r^2 - \frac{2}{3}F(\sqrt{3}r)\right]$$

$$\eta_3 = \frac{C}{\frac{1}{12}\sqrt{3}} = 1 - 2\sqrt{3}\left[\pi r^2 - \frac{1}{2}F(\sqrt{3}r)\right]$$

$$\overline{\eta} = \eta_1 + 2\eta_2 + 3\eta_3 = 2\sqrt{3}\pi r^2$$

where $\eta_i$, is the fraction of the (interior) service area having a coverage level i, and $\overline{\eta}$ is the average coverage level over the entire (interior) service area.

FIG. 7 is a plot 700 of the fraction of an area covered at each of the three possible coverage levels, average coverage level over the entire service area, and maximum average coverage level, each as a function of the normalized coverage area radius for the arrangement of FIG. 5. Shown are the coverage areas at each level (i.e., single coverage 702, double coverage 704, and triple coverage 706). The average coverage level 708 and the maximum coverage level 710 are also shown. The fractional coverage levels satisfy the relation $$\eta_1 + \eta_2 + \eta_3 = 1 \quad (12)$$

Also, the average coverage level may be more simply derived by separately evaluating the fraction of the cluster interior covered by a single transponder platform and multiplying by three (colors):

$$\overline{\eta} = 3 \frac{\frac{1}{6}\pi r^2}{\frac{1}{12}\sqrt{3}} = 2\sqrt{3}\pi r^2 \quad (13)$$

The average coverage level may be increased by assigning a resource (color) not only within the coverage area of the transponder platform assigned that color, but also outside the exclusion band extending a fixed width $\Delta$ from the edge of the coverage area circle. Of course, the exterior of the exclusion band would have to be served by other transponder platforms, i.e., each transponder platform would be assigned more than one color. Equation (13) may be applied to calculate the resulting increase in average coverage level given by $$\delta\overline{\eta} = \frac{3}{\frac{1}{12}\sqrt{3}}\begin{cases} 0 \; r + \Delta \geq 1/\sqrt{3} \\ \frac{1}{12}\sqrt{3} - \frac{1}{6}\pi(r+\Delta)^2 r + \Delta \leq 1/2 \\ \frac{1}{12}\sqrt{3} - \frac{1}{6}\pi(r+\Delta)^2 + \frac{1}{2}F(r+\Delta) \text{ otherwise} \end{cases} \quad (14)$$

where $\delta\overline{\eta}$ represents the increase in the average coverage level due to assignment of resources outside their exclusion bands. In relation (14) the first term is the cluster area, the second term is the interior of the circle circumscribing the exclusion band, and the third term corrects for that part of the exclusion band that falls outside the cluster interior.

Assuming that the width of the exclusion band determines the minimum separation between two coverage areas assigned the same color, the relation between the width of the exclusion band and the size of the normalized coverage area served by a single platform is given by $$\frac{1}{2}\Delta = \frac{1}{2} - r \quad (15)$$

$$r + \Delta = 1 - r$$

Substituting relation (15) into (14) for the increase in average coverage level gives the result $$\delta\overline{\eta} = \sqrt{3}\begin{cases} 0 \; r \leq 1 - 1/\sqrt{3} \\ \sqrt{3} - 2\pi(1-r)^2 + 6F(1-r) \text{ otherwise} \end{cases} \quad (16)$$

This result is added to the average coverage level to obtain the maximum coverage level 710, which achieves saturated (three color) coverage. As may be appreciated from FIG. 7, it is clearly possible to achieve high coverage levels while maintaining a substantial exclusion band between coverage areas assigned the same color. For example, the average coverage level exceeds double coverage as long as the normalized radius of the single transponder platform coverage area exceeds 0.43. This would allow an exclusion band having a width of 0.14. If the width of the exclusion band is assumed to be approximately the diameter of a single spot beam, then the area of the single transponder platform coverage area would be about 37 spot beams for this example.

Four Color Example

Figure 8:
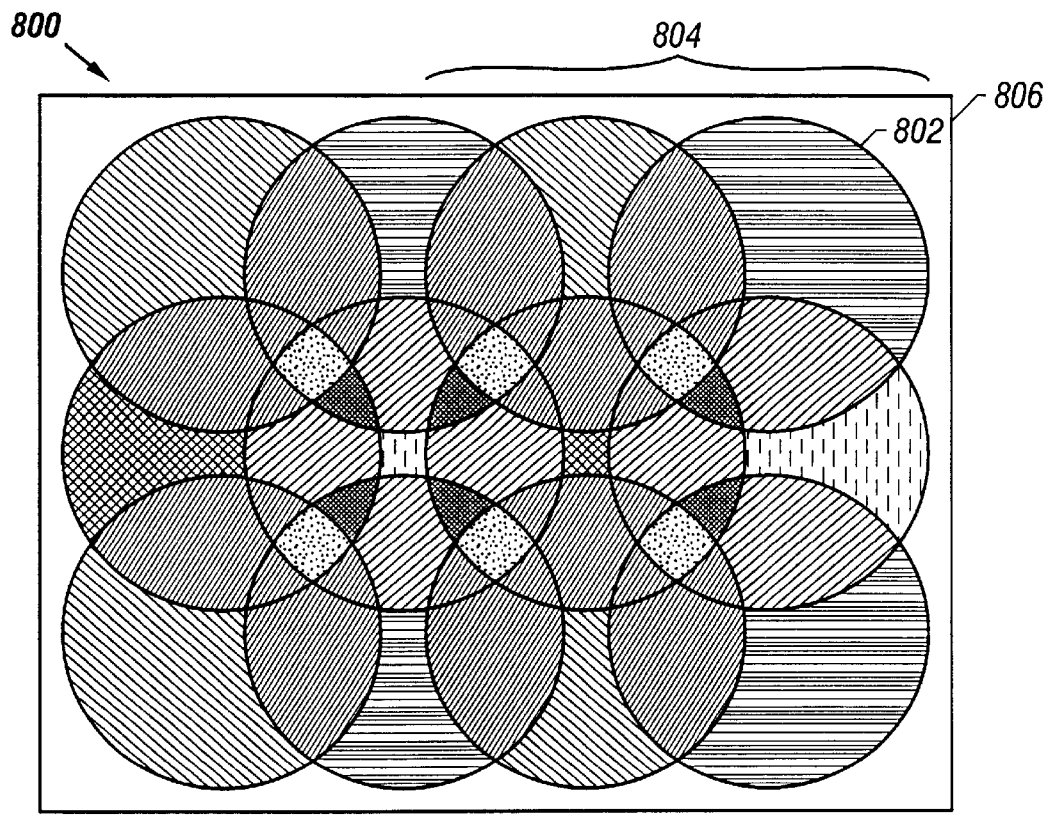
FIG. 8 is a diagram illustrating coverage levels provided by a constellation of 12 transponder platforms using a four color scheme according to a further embodiment of the present invention.

A more uniform coverage level than that described above may be obtained by increasing the number of resources (colors) from three to four. FIG. 8 is a diagram illustrating coverage levels provided by a constellation of 12 transponder platforms using a four color scheme 800. The single platform coverage areas 802 are grouped into square-shaped clusters 804. Each cluster 804 has the shape of a square and contains exactly one coverage area 802 of each color centered on a vertex of the square. The squares are arranged in a square grid 806 that defines the service area. All of the clusters 804 are related to one another through rotations and/or reflections, therefore an analysis of one cluster 804 is applicable to all.

As explained above, a lower limit on the size of the coverage areas follows from the requirement to provide at least single coverage everywhere in the service area, i.e., no gaps are permitted. The center of each square cluster 804 must therefore include all four colors of coverage areas 802, i.e., $$r \geq \frac{1}{2\sqrt{2}} \quad (17)$$

Combining relation (17) with the upper limit of relation (6) that forbids overlap of like-colored coverage areas 802 gives $$\frac{1}{2\sqrt{2}} \leq r \leq \frac{1}{2}(1-\Delta) \quad (18)$$

Figure 9A:
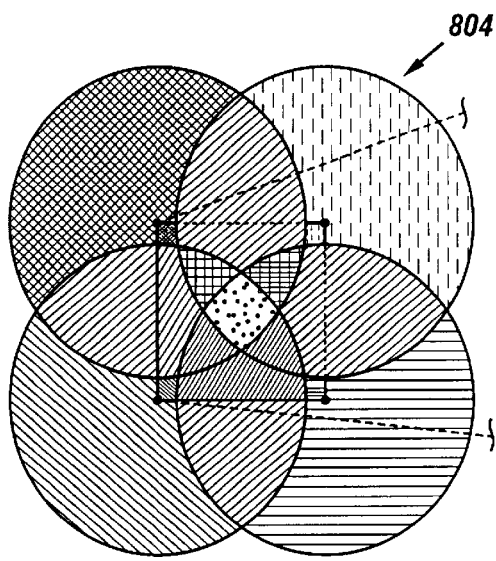
FIG. 9A is a diagram of coverage within a single square cluster of FIG. 8.
Figure 9B:
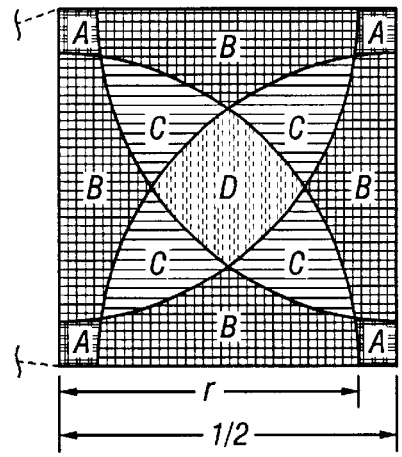
FIG. 9B is a detailed diagram of levels of area coverage within the square cluster of FIG. 9B.

FIG. 9A is a diagram of coverage within a single square cluster 804 of FIG. 8. FIG. 9B is a detailed diagram of levels of area coverage within the square cluster 804 of FIG. 9B. Each of the four possible coverage levels is indicated for each overlap region as follows: single coverage areas are labeled "A", double coverage areas are labeled "B", triple coverage areas are labeled "C", and quadruple coverage areas are labeled "D".

The following relations using formula (2) for F(r) describe the area for each coverage level:

$$4(A + 2B + 3C + D) = \pi_r^2 \quad (19)$$

$$2(B + 2C + D) = \frac{1}{4}F(2r)$$

$$2C + D = \frac{1}{2}F(\sqrt{2r})$$

$$4A + 4B + 4C + D = \frac{1}{4}$$

Relations (19) may be solved to obtain $$A = -\frac{\pi}{4}r^2 + \frac{1}{4}F(\sqrt{2r}) + \frac{1}{8} \quad (20)$$

$$B = \frac{1}{8}F(2r) - \frac{1}{2}F(\sqrt{2r})$$

$$C = \frac{\pi}{2}r^2 - \frac{1}{4}F(2r) + \frac{1}{4}F(\sqrt{2r}) - \frac{1}{8}$$

$$D = -\pi_r^2 + \frac{1}{2}F(2r) + \frac{1}{4}$$

The resulting fractional and average coverage levels within the cluster 804 are given by $$\eta_1 = \frac{4A}{1/4} = 2 - 4[\pi_r^2 - F(\sqrt{2r})] \quad (21)$$

$$\eta_2 = \frac{4B}{1/4} = 2[F(2r) - 4F(\sqrt{2r})]$$

$$\eta_3 = \frac{4C}{1/4} = -2 + 8\left[\pi_r^2 - \frac{1}{2}F(2r) + \frac{1}{2}F(\sqrt{2r})\right]$$

$$\eta_4 = \frac{D}{1/4} = 1 - 4\left[\pi_r^2 - \frac{1}{2}F(2r)\right]$$

$$\bar{\eta} = \eta_1 + 2\eta_2 + 3\eta_3 + 4\eta_4 = 4\pi_r^2$$

where $\eta_i$ is the fraction of the (interior) service area having a coverage level i, and $\bar{\eta}$ is the average coverage level over the entire (interior) service area.

Figure 10:
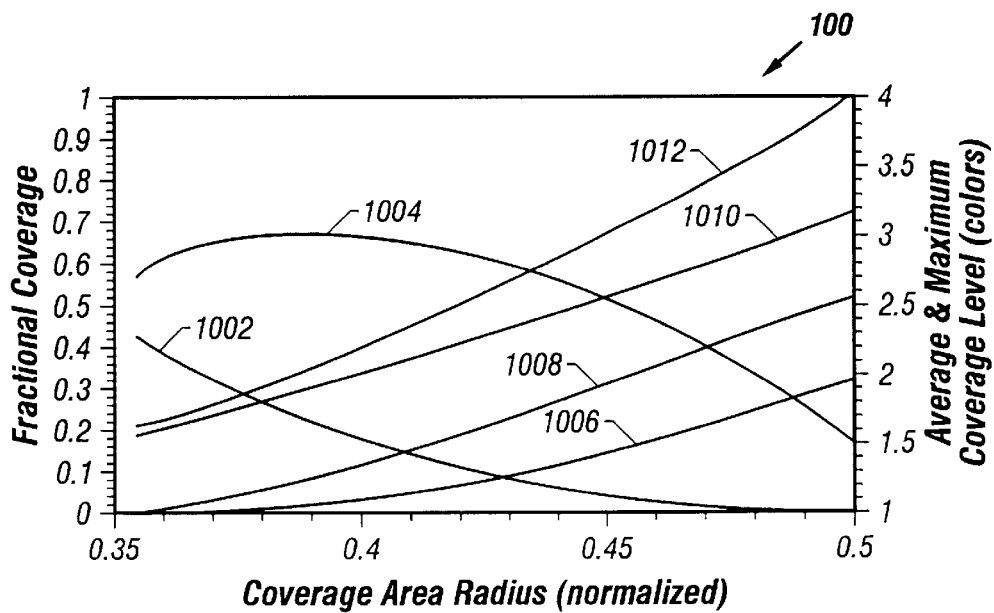
FIG. 10 is a plot of the fraction of an area covered at each of four possible coverage levels, average coverage level over the entire service area, and maximum average coverage level, each as a function of the normalized coverage area radius for the arrangement of FIG. 8.

FIG. 10 is a plot 1000 of the fraction of an area covered at each of the four possible coverage levels, average coverage level over the entire service area, and maximum average coverage level, each as a function of the normalized coverage area radius for the arrangement of FIG. 8. Shown are the fractional coverage areas at each level (i.e., single coverage 1002, double coverage 1004, triple coverage 1006, and quadruple coverage 1008). The average coverage level 1010 and the maximum coverage level 1012 are also shown. Once again, the fractional coverage levels satisfy the relation $$\eta_1 + \eta_2 + \eta_3 + \eta_4 = 1 \quad (22)$$

As before, the average coverage level may be more simply derived by separately evaluating the fraction of the cluster interior covered by each transponder platform and multiplying by four (colors):

$$\bar{\eta} = 4\frac{\frac{1}{4}\pi_r^2}{1/4} = 4\pi_r^2 \quad (23)$$

The average coverage level may be increased by assigning a resource (color) not only within the coverage area of the transponder platform assigned that color, but also in the exterior of the exclusion band extending a fixed width Δ from the edge of the coverage area circle. Equation (23) may be applied to calculate the resulting increase in average coverage level given by $$\delta\bar{\eta} = \frac{4}{1/4}\begin{cases} 0 & r + \Delta \geq \frac{1}{\sqrt{2}} \\ \frac{1}{4} - \frac{1}{4}\pi(r+\Delta)^2 & r + \Delta \leq \frac{1}{2} \\ \frac{1}{4} - \frac{1}{4}\pi(r+\Delta)^2 + \frac{1}{2}F(r+\Delta) & \text{otherwise} \end{cases} \quad (24)$$

where $\delta\bar{\eta}$ represents the increase in the average coverage level due to assignment of resources outside their exclusion bands. In relation (24) the first term is the cluster area, the second term is the interior of the circle circumscribing the exclusion band, and the third term corrects for that part of the exclusion band that falls outside the cluster interior.

Assuming that the width of the exclusion band determines the minimum separation between two coverage areas assigned the same color, the relation between the width of the exclusion band and the size of the normalized coverage area served by a single platform is given by $$\frac{1}{2}\Delta = \frac{1}{2} - r \quad (25)$$

$$r + \Delta = 1 - r$$

Substituting relation (25) into (24) for the increase in average coverage level gives the result $$\delta\bar{\eta} = \begin{cases} 0 & r \leq 1 - \frac{1}{\sqrt{2}} \\ 4 - 4\pi(1-r)^2 + 8F(1-r) & \text{otherwise} \end{cases} \quad (26)$$

This result is added to the average coverage level to obtain the maximum coverage level 1012, which achieves saturated (four color) coverage. As may be appreciated from FIG. 10, it is clearly possible to achieve high coverage levels while maintaining a substantial exclusion band between coverage areas assigned the same color. For example, the average coverage level exceeds double coverage as long as the normalized radius of the single transponder platform coverage area exceeds 0.40. This would allow an exclusion band having a width of 0.20. If the width of the exclusion band is assumed to be approximately the diameter of a single spot beam, then the area of the single transponder platform coverage area would be about 16 spot beams for this example. In another example, the average coverage level exceeds triple coverage as long as the normalized radius of the single platform coverage area exceeds 0.49, but this would only allow an exclusion band of width 0.02. Again taking the width of the exclusion band to be roughly the diameter of a single spot beam, the single platform coverage area would be about 2400 spot beams.

In contrast to the three color scheme, the values of the various coverage levels are significantly affected in the four color scheme by the assignment of resources outside the exclusion band. The average coverage level exceeds double coverage as long as the normalized radius of the single platform coverage area exceeds 0.38, which would allow an exclusion band of width 0.24. This implies a single platform coverage area of about 10 spot beams. In another example, the average coverage level exceeds triple coverage as long as the normalized radius of the single platform coverage area exceeds 0.45, which would allow an exclusion band having a width of only 0.10. In this example, the single platform coverage area would be about 81 spot beams.

An advantage of the four color scheme is that zones having only single coverage may be completely eliminated by assigning resources outside the exclusion band. This is possible for realistic coverage area sizes where only two colors are assigned to each platform, for example by assigning each platform in FIG. 9A the color of the diagonally opposite platform in the cluster as a secondary resource. The condition for eliminating the single coverage zones is given by $$r \geq \frac{\frac{1}{8} + \left(1 - \frac{\sqrt{2}}{4}\right)^2}{2\left(1 - \frac{\sqrt{2}}{4}\right)} \cong 0.42 \quad (27)$$

which would correspond to a coverage area of 110 beams.

Figure 11:
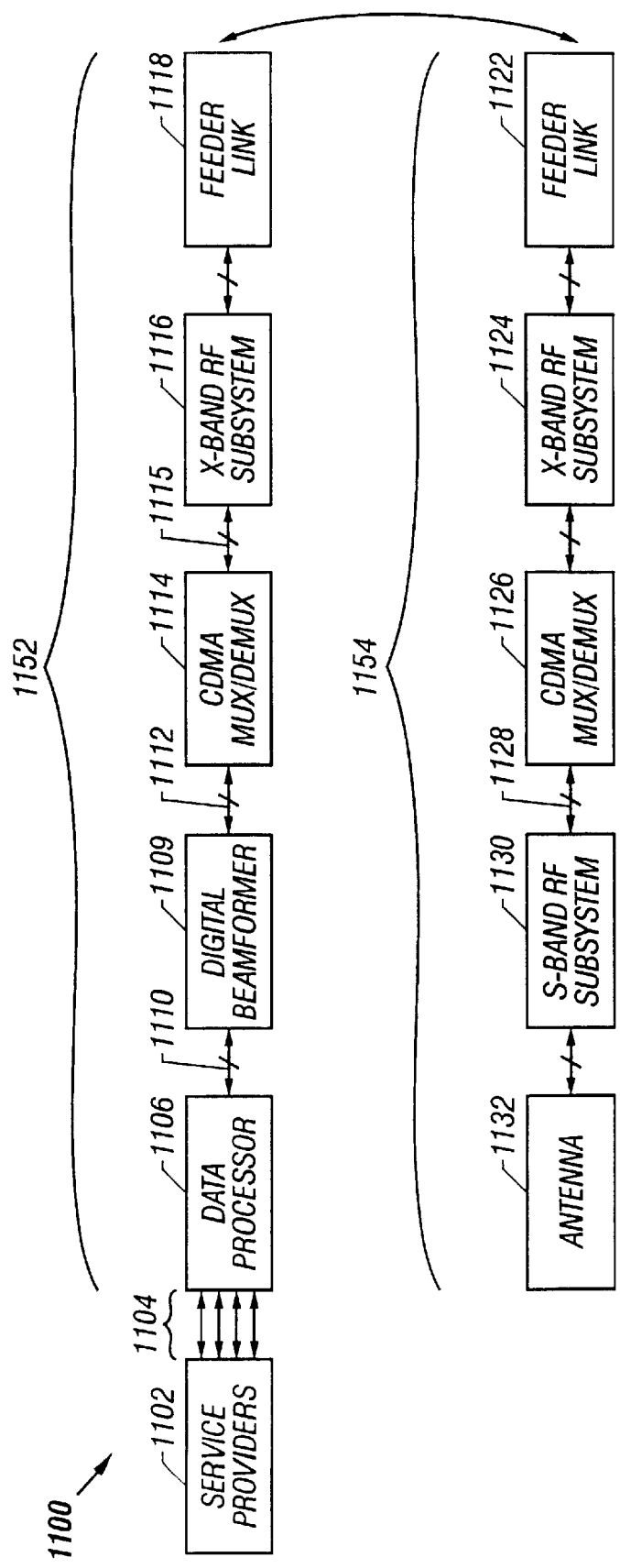
FIG. 11 is a block diagram of an exemplary ground-based beamformer that may be used to implement the methods illustrated in FIGS. 5 and 8.

FIG. 11 is a block diagram of an exemplary ground-based beamformer 1100 that may be used to implement the methods illustrated in FIGS. 5 and 8. The ground-based beamformer 1100 includes a ground station 1152 and a transponder platform 1154.

Shown in the ground station 1152 are a data processor 1106 that interfaces with communications traffic 1104 to and from service providers 1102, a digital beamformer 1109, beam signals (1–N) 1110, element signals (1–M) 1112, a CDMA multiplexer/demultiplexer 1114, CDMA signals 1115, A C- or X-band RF subsystem 1116, and a feeder link 1118.

The data processor 1106 of the ground station 1152, for example, the gateway hub 360 of FIG. 3C, performs multiplexing, demultiplexing, routing, and formatting of beam signals 1110 according to well-known techniques. The data processor 1106 is coupled to the digital beamformer 1109 and includes the functions of integrating coverage areas as described above and illustrated in FIGS. 5 and 8.

The beam signals 1110 are received as element delays and communications signals from the data processor 1106 by the digital beamformer 1109 when transmitting beams or generated as beamformed signals by the digital beamformer 1109 and input to the data processor 1106 when receiving beams. The digital beamformer 1109 receives as inputs or generates as outputs element signals 1112 corresponding to the beam signals 1110. The digital beamformer 1109 may be implemented using well-known techniques. A code division multiple access (CDMA) mux demux 1114 multiplexes/demultiplexes the element signals 1112 as described above to/from a C- or X-band RF subsystem 1116 according to well-known techniques. The C- or X-band RF subsystem 1116 inputs/outputs CDMA signals 1115 and transmits/receives C- or X-band signals 1117 to/from a feeder link 1118 that links the element signals 1112 between the ground station 1152 and the transponder platform 1154.

The transponder platform 1154, for example, one of the transponder platforms 352, 354, and 356 in FIG. 3C, includes a feeder link 1122, a C- or X-band RF subsystem 1124, and a CDMA multiplexer/demultiplexer 1126 that may be implemented according to well known techniques as described above. An S-band RF subsystem 1130 amplifies element signals (1–M) 1128 for transmitting/receiving by an antenna 1132 mounted on the transponder platform 1154 to illuminate a coverage area. The operation of the antenna 1132 is assumed to be reversible between transmit and receive modes, thus the beamforming method of this example applies both to transmitting and receiving signals. Note that although FIG. 11 illustrates communications between the ground station 1152 and a single transponder platform 1154, the ground station 1152 can readily be adapted by one skilled in the art to communicate with multiple transponder platforms, as shown in the example of FIG. 3C.

Other modifications, variations, and arrangements of the present invention may be made in accordance with the above teachings other than as specifically described to practice the invention within the spirit and scope of the following claims.

What is claimed is:

1. A method for integrating coverage areas for multiple transponder platforms comprising the step of arranging a plurality of coverage areas in a cluster wherein each of the plurality of coverage areas is assigned a color that differs from that of every other coverage area in the cluster and wherein each of the plurality of coverage areas overlaps at least one other coverage area in the cluster for maximizing utilization of multiple system resources.

2. The method of claim 1 wherein each of the plurality of coverage areas has a center that defines a vertex of an N-sided polygon.

3. The method of claim 2 wherein N is one of 3 and 4.

4. The method of claim 1 wherein every point in the lattice is covered by at least one of the plurality of coverage areas.

5. The method of claim 1 further including the step of shaping at least one of the plurality of coverage areas so that the at least one of the plurality of coverage areas is defined by a circle having a radius r.

6. The method of claim 1 further including the step of maintaining an exclusion band around at least one of the plurality of coverage areas wherein the exclusion band has an outer perimeter that does not intersect any other of the plurality of coverage areas assigned the same color.

7. The method of claim 6 wherein the width of the exclusion band is substantially equal to a diameter of a spot beam.

8. The method of claim 6 further including the step of assigning a color outside the at least one of the plurality of coverage areas, the color not being excluded by the exclusion band around the at least one of the plurality of coverage areas.

9. The method of claim 1 wherein at least one of the plurality of coverage areas comprises a plurality of spot beams.

10. The method of claim 9 further including the step of shaping the at least one of the plurality of coverage areas by illuminating a selected group of the plurality of spot beams within the at least one of the plurality of coverage areas to maintain a desired separation among the plurality of coverage areas assigned a same color.

11. A method as recited in claim 9 further comprising forming a reuse pattern within the same color with the plurality of spot beams.

12. A method as recited in claim 1 wherein the cluster comprises more than two colors.

13. An apparatus for integrating coverage areas comprising:
- a plurality of transponder platforms; and
- an antenna coupled to each of the plurality of transponder platforms wherein:
  - each antenna illuminates one of a plurality of coverage areas;
  - the plurality of coverage areas are grouped into at least one cluster,
  - each of the plurality of coverage areas in each cluster of the at least one cluster is assigned a color that differs from that of every other coverage area in each cluster of the at least one cluster, and
  - each of the plurality of coverage areas in each cluster of the at least one cluster overlaps at least one other coverage area in each cluster of the at least one cluster for maximizing utilization of multiple system resources.

14. The apparatus of claim 13 wherein each of the plurality of coverage areas has a center that defines a vertex of an N-sided polygon.

15. The apparatus of claim 14 wherein N is one of 3 and 4.

16. The apparatus of claim 13 wherein the at least one cluster is arranged in a lattice wherein none of the plurality of coverage areas assigned a same color overlaps another of the plurality of coverage areas assigned the same color.

17. The apparatus of claim 16 wherein every point in the lattice is covered by at least one of the plurality of coverage areas.

18. The apparatus of claim 16 wherein at least one of the plurality of coverage areas has a shape defined by a circle having a radius r.

19. The apparatus of claim 16 wherein an exclusion band is maintained around at least one of the plurality of coverage areas wherein the exclusion band has an outer perimeter that does not intersect any other coverage area assigned the same color.

20. The apparatus of claim 19 wherein the width of the exclusion band is substantially equal to a diameter of a spot beam.

21. The apparatus of claim 19 wherein a color is assigned outside the at least one of the plurality of coverage areas, the color not being excluded by the exclusion band around the at least one of the plurality of coverage areas assigned the same color.

22. The apparatus of claim 13 wherein at least one of the plurality of coverage areas comprises a plurality of spot beams.

23. The apparatus of claim 22 wherein at least one of the plurality of coverage areas is shaped by illuminating a selected group of the plurality of spot beams within the at least one of the plurality of coverage areas to maintain a desired separation among the plurality of coverage areas assigned a same color.

24. The apparatus of claim 22 further comprising a beamformer for forming the spot beams.

25. The apparatus of claim 13 wherein at least one of the plurality of transponder platforms is one of a satellite, an antenna tower, and an aircraft.

26. A method for integrating coverage areas for a plurality of transponder platforms comprising the steps of:
- forming a plurality of coverage areas each from a respective one of the plurality of transponder platforms;
- arranging a plurality of coverage areas in a cluster wherein each of the plurality of coverage areas is formed from a plurality of spot beams, and out of a total number of colors, each of the plurality of coverage areas is assigned only one color, said only one color differing from that of every other coverage area in the same cluster and wherein each of the plurality of coverage areas overlaps at least one other coverage area in the same cluster.

27. A method as recited in claim 26 further comprising illuminating only specific spot beams of the plurality of spot beams to maintain a desired separation between coverage areas.

28. A method as recited in claim 26 further comprising adjusting the sizes of the plurality of coverage areas.

29. A method as recited in claim 26 further comprising increasing power to a user by adjusting the sizes of the plurality of coverage areas.

30. A method as recited in claim 26 further comprising adjusting the shapes of the plurality of coverage areas.

31. A method as recited in claim 26 further comprising assigning only one transponder to a platform.

32. A method as recited in claim 26 wherein the total number of colors is greater than 2.

33. A method as recited in claim 26 wherein the total number of colors is greater than 3.

34. A method as recited in claim 26 wherein the cluster is arranged in a lattice where none of the plurality of coverage areas is assigned a same color or overlaps another of the plurality of coverage areas assigned the same color.

35. A method as recited in claim 34 wherein every point in the lattice is covered by at least one of the plurality of coverage areas.

36. A method as recited in claim 34 wherein at least one of the plurality of coverage areas has a shape defined by a circle having a radius r.

37. A method as recited in claim 34 further comprising maintaining an exclusion band around at least one of the plurality of coverage areas wherein the exclusion band has an outer perimeter that does not intersect any other of the plurality of coverage areas assigned the same color.

38. A method as recited in claim 37 wherein the width of the exclusion band is substantially equal to the diameter of one spot beam of the plurality of spot beams.

39. A method of providing coverage in a communication system comprising:
- forming a cluster by overlapping a plurality of coverage areas corresponding to a respective transponder;
- from a total number of colors, assigning only one color for a plurality of spot beams associated with each transponder of the communication system;
- forming a resource reuse pattern for the plurality of spot beams within each of the plurality of coverage areas and wherein the cluster is arranged in a lattice where none of the plurality of coverage areas is assigned a same color or overlaps another of the plurality of coverage areas assigned the same color.

40. A method as recited in claim 39 wherein every point in the lattice is covered by at least one of the plurality of coverage areas.

41. A method as recited in claim 39 wherein at least one of the plurality of coverage areas has a shape defined by a circle having a radius r.

42. A method as recited in claim 39 further comprising maintaining an exclusion band around at least one of the plurality of coverage areas wherein the exclusion band has an outer perimeter that does not intersect any other of the plurality of coverage areas assigned the same color.

43. A method as recited in claim 39 wherein the width of the exclusion band is substantially equal to the diameter of one spot beam of the plurality of spot beams.

44. A method as recited in claim 39 further comprising illuminating only specific spot beams of the plurality of spot beams to maintain a desired separation between coverage areas.

45. A method as recited in claim 39 further comprising adjusting the sizes of the plurality of coverage areas.

46. A method as recited in claim 39 further comprising increasing power to a user by adjusting the sizes of the plurality of coverage areas.

47. A method as recited in claim 39 further comprising adjusting the shapes of the plurality of coverage areas.

48. A method as recited in claim 39 further comprising only one transponder to a platform.

49. A method as recited in claim 39 wherein the total number of colors is greater than 2.

50. A method as recited in claim 39 wherein the total number of colors is greater than 3.

* * * * *